E. D. PATTISON.
DIFFERENTIAL DRIVING MECHANISM.
APPLICATION FILED JULY 19, 1916.
1,224,781.
Patented May 1, 1917.
2 SHEETS—SHEET 2.
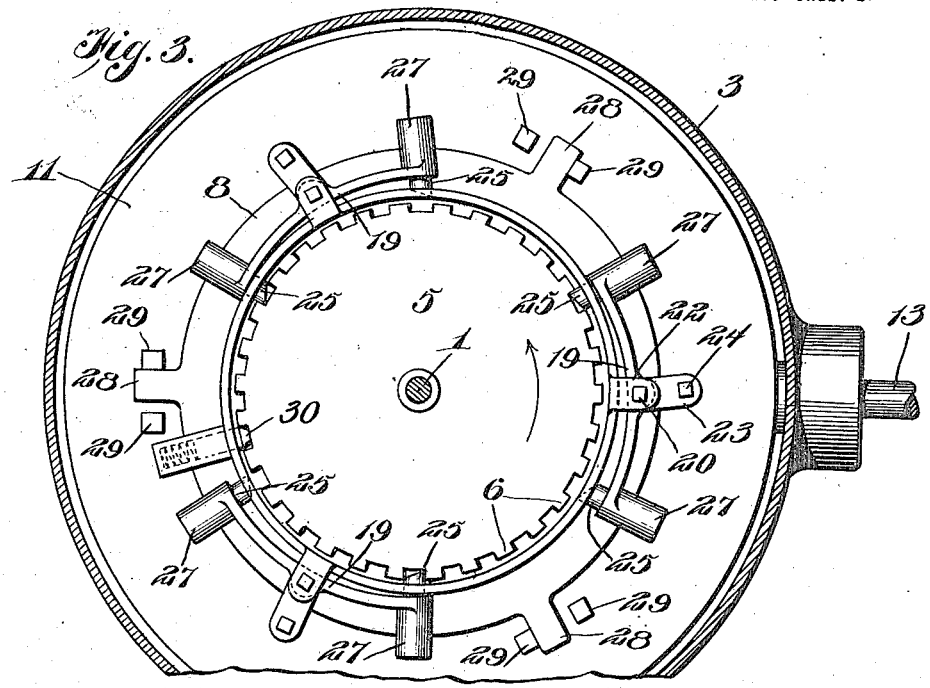
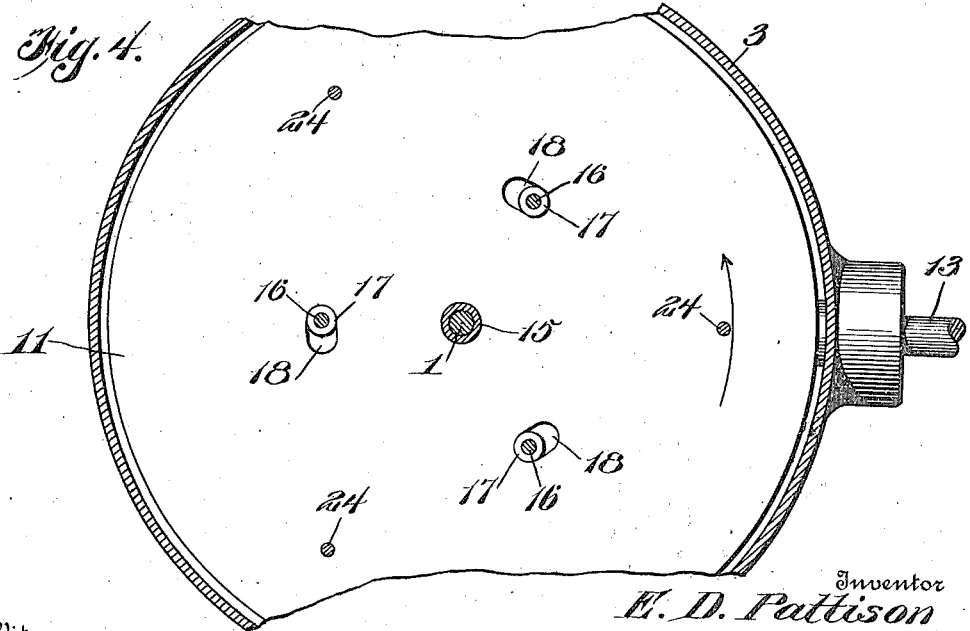
Witnesses
L. R. Heinrichs
R. M. Smith
Inventor
E. D. Pattison
By Victor J. Evans
Attorney

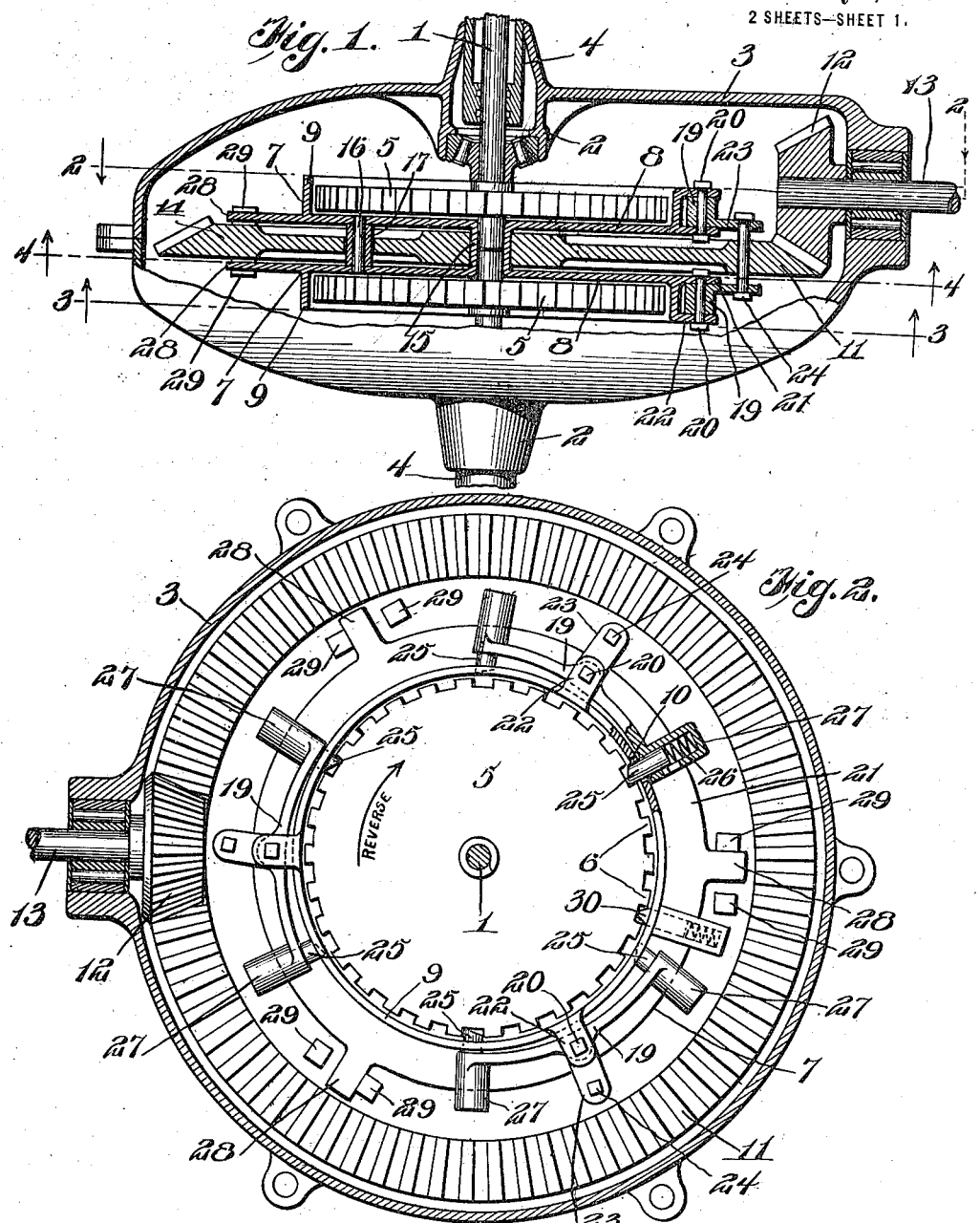

UNITED STATES PATENT OFFICE.

EUGENE D. PATTISON, OF DANVILLE, ILLINOIS.

DIFFERENTIAL DRIVING MECHANISM.

1,224,781.　　　　Specification of Letters Patent.　　Patented May 1, 1917.

Application filed July 19, 1916. Serial No. 110,120.

*To all whom it may concern:*

Be it known that I, EUGENE D. PATTISON, a citizen of the United States, residing at Danville, in the county of Vermilion and State of Illinois, have invented new and useful Improvements in Differential Driving Mechanism, of which the following is a specification.

This invention relates to differential driving mechanism, being especially designed for use in connection with the driving gearing of motor vehicles but being also useful in other connections where it is necessary to provide for varying the relative speed of two alined sections of a driven shaft.

One of the chief objects of the present invention is to dispense with the gearing now commonly employed in mechanism of the character referred to and to substitute in lieu thereof simple and effective means for producing the same result that is now obtained by use of spur gears, bevel gears, and the like, at the same time producing differential driving mechanism which may be economically manufactured and more economically maintained than the ordinary differential gearing by reason of the simplicity of the elements involved and their accessibility.

With the above and other objects in view, the invention consists in the novel construction, combination, and arrangement herein fully described, illustrated and claimed.

In the accompanying drawings:—

Figure 1 is a plan view of the differential driving mechanism of this invention, showing the housing therefor in section.

Fig. 2 is a section on the line 2—2 of Fig. 1.

Fig. 3 is a section on the line 3—3 of Fig. 1.

Fig. 4 is a section on the line 4—4 of Fig. 1.

Referring to the drawings 1 designates a shaft shown as divided or formed in two alined sections, the same being journaled in suitable bearings 2 within the differential housing 3, 4 designating the housing for the shaft 1.

Each shaft section 1 has fast on the inner end thereof a clutch wheel 5 having teeth 6 on the periphery thereof to be engaged by teeth of the dogs hereinafter described. Surrounding each of the wheels 5 is a dog-carrying member 7 comprising a disk like body 8 and a circular rim 9 which is formed at suitable points with openings 10 to receive the teeth of the dogs so that said teeth may engage the teeth 6 of the respective clutch wheel 5.

Interposed between the dog carriers 7 is the master wheel 11 comprising the driving member of the differential mechanism, said master wheel, in automobile practice, being in turn driven by a pinion 12 on the adjacent end of the drive shaft 13. The pinion 12 is shown as of the beveled type while the master wheel 11 is shown as provided with a beveled gear face 14 meshing with said pinion. The dog carriers 7 are rigidly related or fixedly connected to each other, being mounted fast on a central bearing sleeve 15 which extends through the center of the master wheel 11 and forms a bearing therefor. The sleeve 15 also receives or forms a bearing for the inner adjacent ends of the shaft sections 1. The dog carriers 7 are further connected in fixed relation to each other by means of bolts 16 which are surrounded by spacing sleeves 17 between the dog carriers 7, the master wheel 11 being formed with slotted openings 18 to receive the sleeves 17, said openings being arcuate in shape so as to admit of a certain amount of oscillatory movement between the dog carriers and the master wheel.

In the preferred embodiment of this invention I employ in connection with each dog carrier, a plurality of dogs 19 each of which is mounted on a pivot 20 on the carrier, said pivot being supported by an annular flange 21 of the carrier and also by a lug 22 arranged in spaced relation to said flange 21 and extending outwardly from the rim 9. Each dog is provided with an outwardly extending arm 23 which is connected by pivot 24 to the master wheel 11. Therefore, in every relative oscillatory movement which takes place between the master wheel and the dog carrier, each dog is rocked on its pivot 20. Each dog has two clutch teeth 25 the inner ends of which are reversely beveled as shown. Each tooth 25 is yieldingly pressed in an inward direction by means of a spring 26 mounted in a guide 27 in which the respective tooth 25 is mounted for movement in a substantially radial direction. Additional means for limiting the relative oscillatory movement of the master gear and dog carrying members is provided, the same consisting of lugs 28 on the dog carrying members which move back and forth between stop lugs 29 on the master wheel, said lugs 29 being arranged in spaced relation to each other, the space being sufficient to allow for the necessary movement between the master wheel and the dog carrying members to rock the dogs in such manner that only one tooth of each dog will be in engagement with the respective clutch wheel at the same time.

From the foregoing description taken in connection with the accompanying drawings, it will now be understood that when the master wheel 11 is turned in one direction, the dogs 19 will all be rocked in the same direction and the advance tooth of each dog will be thrown into positive engagement with the teeth on the respective clutch wheel 5. In case one of the shaft sections 1 rotates faster than the other section, the beveled faces of the teeth 25 of the dogs 19 will be pushed outwardly against the tension of the springs 21. In automobile practice, this will allow the driving wheel at the right hand side of the vehicle, for example when making a left hand turn, to revolve faster than the wheel at the opposite side of the vehicle. When the vehicle completes its turning movement and proceeds in a straight forward direction, the teeth 25 will again positively engage the teeth of the respective clutch wheel and thereafter power will be imparted to both driving wheels of vehicle. In backing a vehicle, when the master wheel 11 is turned in a reverse direction, all of the dogs will be rocked in the opposite direction and the other tooth of each of said dogs will be moved inwardly into engagement with the clutch wheels. In making a turn while the machine is moving in a rearward direction the same differential movement is provided for in the shaft sections 1, the action of the mechanism shown and described being exactly the same as when the machine is being driven in a forward direction. The mechanism above described dispenses with the usual gear wheels and interposed pinions now in common use and incidentally eliminates all danger of stripping such gears; in fact no gears are employed with the exception of the master wheel 11 and the pinion 12 which drives the same.

The flange 21 of each dog carrier 8 is equipped with a spring pressed latch 30 adapted to engage the teeth of the respective clutch wheel 5 to hold the latter while the dogs 19 are being rocked for the purpose set forth, each latch 30 being tapered toward its inner extremity in order that it may be forcibly thrust outwardly by the teeth 6 of the wheel 5 while making a turn with the vehicle.

It will of course be understood that the mechanism is susceptible of changes in the form, proportion and minor details of construction which may accordingly be resorted to without departing from the principle or sacrificing any of the advantages of the invention.

I claim:—

1. In differential driving mechanism, the combination with a sectional shaft, and a master wheel, of clutch wheels located at opposite sides of said master wheel and each fastened to one of the shaft sections, oscillatory clutch dogs carried by said master wheel, and spring pressed teeth slidably carried by each of said dogs and adapted to coöperate with said clutch wheels.

2. The combination with the adjacent ends of two alined shaft sections, of clutch wheels fast thereon, a master wheel operating between said clutch wheels, annular dog-carrying members at opposite sides of the master wheel and having a positive connection therewith and an oscillatory movement in relation thereto and also formed with guide openings, clutch dogs carried by said master wheels and having a pivotal connection with their carrying members and a positive connection with the master wheel, and spring pressed teeth carried by each of said dogs and working through said guide openings in the carrying members.

3. The combination with the adjacent ends of two alined shaft sections, of clutch wheels fast thereon, a master wheel operating between said clutch wheels, annular dog-carrying members at opposite sides of the master wheel and having a positive connection therewith and an oscillatory movement in relation thereto and also formed with guide openings, means for limiting the relative oscillatory movement of the master wheel and dog carrying members, clutch dogs coöperating with said clutch wheels and having a pivotal connection with their carrying members and a positive connection with the master wheel, each clutch dog embodying two arms each formed with a guiding socket in alinement with one of said guide openings, and spring pressed teeth carried by each of said dogs slidable in the sockets of the arms of the dogs and through the guide openings in the dog-carrying members.

In testimony whereof I affix my signature.

EUGENE D. PATTISON.

Copies of this patent may be obtained for five cents each, by addressing the "Commissioner of Patents, Washington, D. C."